US011283704B2

(12) United States Patent
Indiresan et al.

(10) Patent No.: US 11,283,704 B2
(45) Date of Patent: Mar. 22, 2022

(54) DIAGNOSING AND RESOLVING ISSUES IN A NETWORK USING PROBE PACKETS

(71) Applicant: Cisco Technology, Inc., San Jose, CA (US)

(72) Inventors: Atri Indiresan, Sunnyvale, CA (US); Frank Brockners, Cologne (DE); Akshay Dorwat, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 16/744,447

(22) Filed: Jan. 16, 2020

(65) Prior Publication Data
US 2021/0226879 A1 Jul. 22, 2021

(51) Int. Cl.
*H04L 12/26* (2006.01)
*H04L 29/06* (2006.01)
*H04L 43/12* (2022.01)
*H04L 43/0823* (2022.01)

(52) U.S. Cl.
CPC .......... *H04L 43/12* (2013.01); *H04L 43/0823* (2013.01); *H04L 63/1425* (2013.01); *H04L 63/1458* (2013.01)

(58) Field of Classification Search
None
See application file for complete search history.

(56) References Cited

U.S. PATENT DOCUMENTS

| 2004/0250158 | A1* | 12/2004 | Le Pennec | H04L 41/28 714/4.1 |
| 2010/0097986 | A1* | 4/2010 | Ylitalo | H04W 40/36 370/328 |
| 2014/0237094 | A1* | 8/2014 | Mataitis | H04L 41/0686 709/223 |
| 2016/0149800 | A1* | 5/2016 | Li | H04L 69/16 370/392 |
| 2017/0085531 | A1* | 3/2017 | Song | H04L 63/1408 |
| 2019/0349290 | A1* | 11/2019 | Pignataro | H04L 43/0847 |
| 2019/0386876 | A1* | 12/2019 | Sridhar | H04L 41/12 |

OTHER PUBLICATIONS

X. Min, G. Mirsky, L. Bo, Echo Request/Reply for In-situ OAM Capabilities, pp. 1-14, Oct. 26 (Year: 2019).*
Author Unknown TTL Expiry Attack Identification and Mitigation, pp. 1-9 (Year: 2019).*
"Arista User Manual; Arista Networks; Arista EOS version 4.27.0F, DOC-03495-18," Arista, retrieved from <<https://www.arista.com/assests/data/pdf/user-manual/um-books/EOS-4.27.0F-Manual.pdf>> on Dec. 21, 2021, 3740 pages.
(Continued)

*Primary Examiner* — Christopher M Crutchfield
(74) *Attorney, Agent, or Firm* — Lee & Hayes, P.C.

(57) ABSTRACT

This disclosure describes various methods, systems, and devices related to identifying an issue in a network using a probe packet. An example method includes identifying an expired data packet transmitted in a network and addressed to a destination; generating a probe packet addressed to the destination; and forwarding the probe packet. When the probe packet is received, a report indicating a routing loop in the network can be transmitted to an administrator.

19 Claims, 9 Drawing Sheets

(56) References Cited

OTHER PUBLICATIONS

Ovomic, Transfer of Information (TOI); Layer 2 loop protection; Arista EOS-4.15.0F transfer of information; Content template; ZTPServer v1.3; Network Virtualization Hersey on building "A Perfect virtual Lab Switch"; DataSift on "Platform Performance Gains with Arista Switches"; Ken Duda on Physical Networks in a Virtual World; ZTPServer v1.1.0; Arista Networks and VMware: A Technical Review with Kenneth Duda and Bruce Davie; Arista Networks OMI Integration with Microsoft; Collecting logs for Arista TAC cases using logGrab; CyberMashup EOS testimonial; Arista.

\* cited by examiner

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version 210 | | | | IHL 212 | | | | DSCP 214 | | | | | | ECN 216 | | Total Length 218 | | | | | | | | | | | | | | | |
| 4 | 32 | Identification 220 | | | | | | | | | | | | | | | | Flags 222 | | | Fragment Offset 224 | | | | | | | | | | | | |
| 8 | 64 | Time to Live = 255 226 | | | | | | | | Protocol = UDP 228 | | | | | | | | Header Checksum 230 | | | | | | | | | | | | | | | |
| 12 | 96 | Source Address = Probe-Specific Node ID 232 | | | | | | | | | | | | | | | | | | | | | | | | | | | | | | | |
| 16 | 128 | Destination Address = Destination ID 234 | | | | | | | | | | | | | | | | | | | | | | | | | | | | | | | |
| 20 | 160 | Options 236 | | | | | | | | | | | | | | | | | | | | | | | | | | | | | | | |
| 24 | 192 | | | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

| Offsets | Octet | 0 | | | | | 1 | | | | | 2 | | | | | 3 | | | | |
|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9-11 | 12-15 | 16-19 | 20-23 | 24-27 | 28-31 |
| 0 | 0 | Version 240 | | | | Traffic Class 242 | | | | | | Flow Label 244 | | | | |
| 4 | 32 | Payload Length 246 | | | | | | | | | | | | Next Header = UDP 248 | | Hop Limit = 255 250 |
| 8 | 64 | Source Address = Probe-Specific Node ID 252 | | | | | | | | | | | | | | |
| 12 | 96 | | | | | | | | | | | | | | | |
| 16 | 128 | | | | | | | | | | | | | | | |
| 20 | 160 | | | | | | | | | | | | | | | |
| 24 | 192 | Destination Address = Destination ID 254 | | | | | | | | | | | | | | |
| 28 | 224 | | | | | | | | | | | | | | | |
| 32 | 256 | | | | | | | | | | | | | | | |
| 36 | 288 | | | | | | | | | | | | | | | |

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source Port 256 | | | | | | | | | | | | | | | | Destination Port = 9 258 | | | | | | | | | | | | | | | |
| 4 | 32 | Length 260 | | | | | | | | | | | | | | | | Checksum 262 | | | | | | | | | | | | | | | |

DIAGNOSING AND RESOLVING ISSUES IN A NETWORK USING PROBE PACKETS

TECHNICAL FIELD

The present disclosure relates generally to using probe packets to diagnose at least one issue in a network. The probe packets can be used to identify whether the network is a victim of a Denial of Service (DoS) attack, the network has a temporary routing loop, the network has a persistent routing loop, or the like.

BACKGROUND

Data can flow through a network in the form of data packets (also referred to as "network packets"). A data packet may include a header, which may carry various control information that enables the network to deliver the data packet. For instance, the header may indicate a source of the data packet, a destination of the data packet, or the like. The data packet may include a payload, which may include user- or application-plane data carried by the data packet. In some cases, the data packet may further include a trailer that can include control information indicating the end of the data packet.

For various reasons, a data packet may travel through the network without reaching its destination. To prevent the data packet from circulating indefinitely in a network, the data packet may include an expiration field, such as a Time to Live (TTL), hop count, or hop limit. The expiration field may be part of the header of the data packet. For instance, an Internet Protocol (IP) version 4 (IPv4) packet header includes a TTL field. As the IPv4 packet travels through the network, each router on route to the packet's destination may reduce the TTL value in the packet. In an example, when a router reduces the TTL value to zero, the router refrains from forwarding the IPv4 packet. An example IP version 6 (IPv6) packet includes a hop limit field, which includes a hop limit value. According to some examples, as the IPv6 packet travels through the network, each router on route to the packet's destination reduces the hop limit value in the packet. When a router reduces the hop limit value to zero, the router may refrain from forwarding the IPv6 packet.

In some cases, when a router discards a data packet whose expiration field has a value of zero, the router may transmit an error message to the source of the data packet. The Internet Control Message Protocol (ICMP) is an example of a supporting protocol by which the router may report the discarded data packet. For instance, according to ICMP, a router may generate a Time Exceeded packet and transmit the Time Exceeded packet to the source of the data packet.

Upon the source receiving the Time Exceeded packet, the source may identify that there is some problem in the network. However, the Time Exceeded packet does not diagnose the problem. For instance, the Time Exceeded packet does not enable the source to distinguish whether the data packet traveled through a temporary routing loop (e.g., during a routing protocol convergence). Further, the Time Exceeded packet does not enable the source to identify whether the data packet failed to reach its destination due to a persistent routing loop in the network.

Furthermore, although current ICMP mechanisms, like Time Exceeded packets, can enable individual sources to identify whether data packets expire in the network, they do not necessarily enable a centralized controller to identify whether data packets from multiple sources expire in the network.

In some cases, issues with a network can be identified using post-hoc methods. For instance, network logs can be analyzed manually or using complex computer algorithms to identify the possibility of routing loops through the network. However, post-hoc methods cannot identify the presence of routing loops, or other issues with the network, in real time. Accordingly, routing loops and other issues may persist for an extended period of time before they are addressed by a manager of the network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A to 2D illustrate various elements of example probe packets. FIG. 2A illustrates an overall structure of an example probe packet. FIG. 2B illustrates an example IPv4 header of the probe packet. FIG. 2C illustrates an example IPv6 header of the probe packet.

FIG. 2D illustrates an example of the UDP header.

DESCRIPTION OF EXAMPLE EMBODIMENTS

Overview

Figure 1:
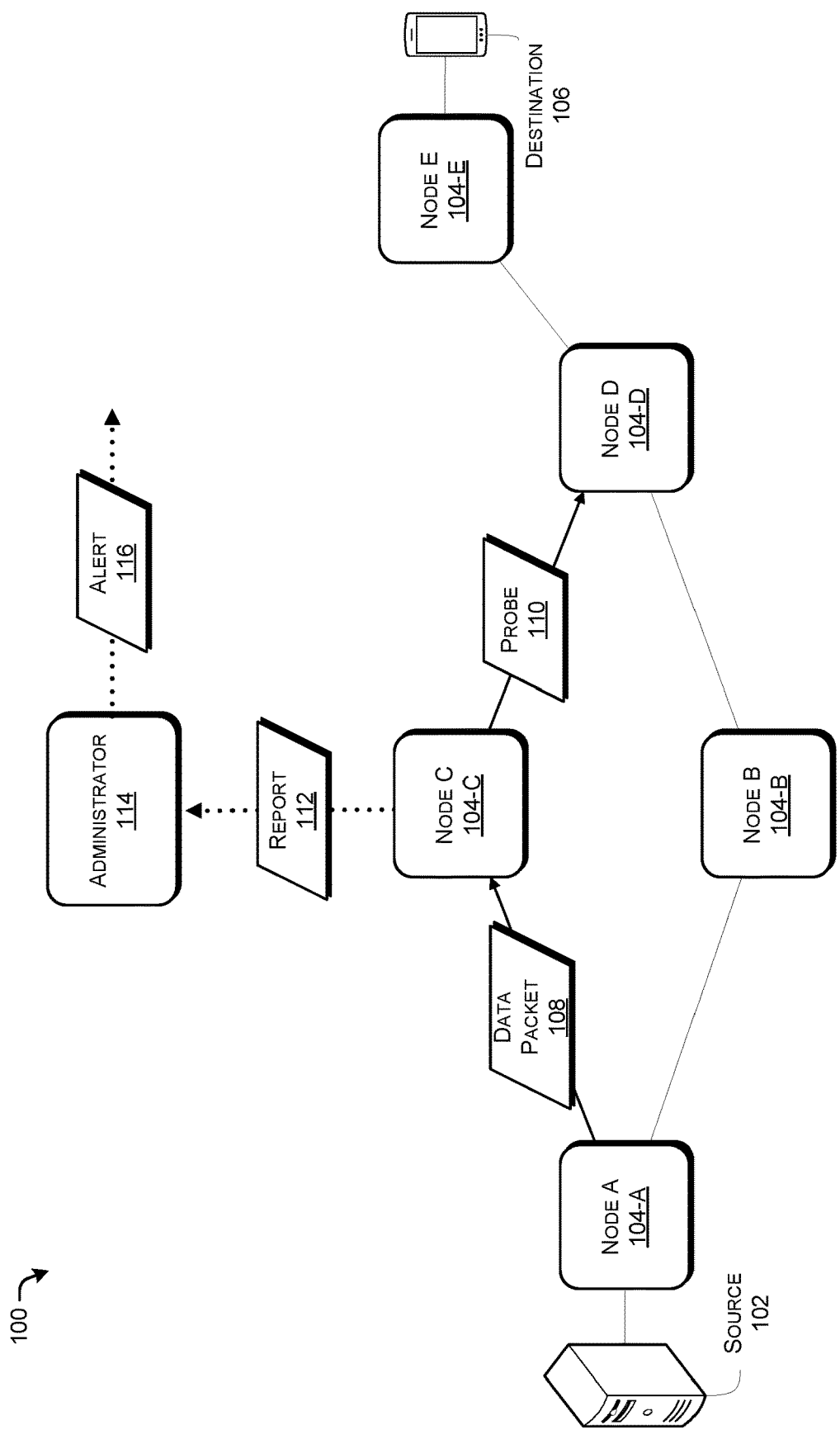
FIG. 1 illustrates an example environment for diagnosing issues in a network.

This disclosure describes various techniques for diagnosing issues in a network using probe packets. In various implementations, a network node, in a network, may generate a probe packet in response to receiving an expired data packet (e.g., a unicast data packet) associated with a data flow. The probe packet may include a probe-specific source identifier that corresponds to the network node and may be addressed to the destination of the expired data packet. The network node may forward the probe packet toward the destination. The network node may identify an issue with the network based on the probe packet. If the probe packet returns to the network node, the network node may identify that a routing loop is present in the network. If the probe packet does not return to the network node, but the network node continues to receive a significant number of expired packets in the data flow, the network node may identify that a possible DoS attack is or has targeted the network and/or may identify that a misbehaving and/or malfunctioning application is operating within the network.

According to various implementations, the network node can transmit a report to a central administrator. In some cases, multiple network nodes within the network may independently generate and transmit reports to the administrator. Each report may indicate details of an issue sensed by the reporting network node and/or behavior of at least one probe packet through the network. Upon receiving the report(s), the administrator may identify an issue with the network. In addition, the administrator may initiate at least one action to resolve the issue. For instance, the administrator may alert one or more users of the issue.

Example Embodiments

Various example embodiments of the present disclosure relate to diagnosing and/or resolving issues in a network using probe packets. Implementations described herein provide particular improvements to the field of computer networking. Although issues with a network can be diagnosed using post-hoc strategies, such as analyzing network logs after the issue has occurred, various implementations of the present disclosure can be used to identify issues with a network substantially in real-time. In various examples of the present disclosure, a network node may identify and/or report the presence of an issue with a network shortly after the issue arises in the network. Accordingly, issues can be identified and resolved more efficiently using implementations of the present disclosure than using post-hoc diagnosis strategies.

Implementations of various functionalities described herein can be implemented by one or more networked devices. Some implementations can be performed by network nodes, servers, or other devices.

Various implementations of the present disclosure will be described in detail with reference to the drawings, wherein like reference numerals present like parts and assemblies throughout the several views. Additionally, any samples set forth in this specification are not intended to be limiting and merely set forth some of the many possible implementations.

FIG. 1 illustrates an example environment 100 for diagnosing issues in a network. As illustrated, the environment includes a source 102, multiple intermediary nodes 104-A to 104-E, and a destination 106. As used herein, the terms "node," "network node," and their equivalents, can refer to any entity within a network that can transmit packets to and/or receive packets from at least one other node. A node may be a device, a software instance, a Virtual Machine (VM), a container, a virtual process, or the like. In some examples, a node may include a grouping of devices or virtual resources, such as security groups, subnetworks, and so forth. In some examples, a node can be a client, a server, or a combination thereof. In some cases, a node can be an endpoint of a flow, such as a source (e.g., the source 102) or a destination (e.g., the destination 106). In some cases, a node can be a network switch, network router, or the like. The nodes 104-A to 104-E may comprise a network.

Each one of the source 102 and the destination 106 may include at least one server, a User Equipment (UE), or the like. As used herein, the terms "UE," "user device," "wireless communication device," "communication device," "mobile device," "client device," and "terminal" can be used interchangeably herein to describe any UE that is capable of transmitting/receiving data (e.g., wirelessly) using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology. In general, a UE can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like. The source 102 may be configured to inject data packets addressed to the destination 106 into the network. The destination 106 may be configured to receive data packets that are addressed to the destination 106 from the network.

Various elements within the environment 100 can be connected via interfaces. As used herein, the term "interface," and its equivalents, can refer to a connection between two nodes in a network. In some cases, an interface may directly connect the two nodes and/or may omit any intermediary nodes. An interface may be connected to a first port of a first device and to a second port of a second device. In some cases, an interface between two nodes can be a wired interface, such that a packet can be transmitted as a signal conducted through a solid medium (e.g., an Ethernet cable, a fiber-optic cable, etc.) connecting the two nodes. In some examples, an interface between nodes can be a wireless interface, such that a packet can be transmitted as a signal through a fluid medium (e.g., air, water, etc.) connecting the two nodes. A wireless interface may be defined according to a type of wave used to carry the signal (e.g., a sound wave, an electromagnetic wave, etc.) and a frequency of the wave (e.g., an ultrasonic frequency, a radio frequency, an infrared frequency, etc.). An interface may be further defined according to a particular communication protocol, which may indicate how data transmitted over the interface is modulated. Some examples of communication protocols applicable to this application include TCP/IP, Wi-Fi, Bluetooth, or the like. As illustrated in FIG. 1, an interface may connect the source 102 to node A 104-A, an interface may connect node A 104-A to node C 104-C, an interface may connect node A 104-A to node B 104-B, an interface may connect node C 104-C to node D 104-D, an interface may connect node B 104-B to node D 104-D, an interface may connect node D 104-D to node E 104-E, an interface may connect node E 104-E to the destination 106, and so on. Although not illustrated in FIG. 1, the environment 100 can include additional nodes interconnected by additional interfaces.

In various implementations, the source 102 may address multiple data packets to the destination 106 and transmit the data packets into the network via the nodes 104-A to 104-D. As used herein, the terms "packet," "data packet," and their equivalents, can refer to a unit of data that is transmitted between two nodes. In various examples, a packet may have a header, which may include control data, and a payload, which may include user data. The header may include information such as an identifier of the source of the packet, an identifier of the destination of the packet, an indication of the type of user data in the payload, or the like. In some cases, a packet can be defined by a particular networking protocol, such as IP, TCP, UDP, or another networking protocol. In some implementations, a packet can be an IPv4 packet, an IPv6 packet, or the like. For instance, the data packets transmitted by the source 102 may each include a header that indicates an IP address of the source 102. In various implementations, the data packets addressed to the destination 106 may each include a header that indicates an IP address of the destination 106. In various examples, the data packets are unicast data packets.

The data packets injected into the network by the source 102 and addressed to the destination 106 may be part of a single flow. As used herein, the terms "flow," "data flow," "traffic flow," "packet flow," and their equivalents, can refer to multiple packets transmitted from a source to a destination. In some examples, a flow may include packets that share at least one of the same ingress interface (e.g., SNMP ifIndex), source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)). As used herein, the term "port," and its equivalents, can refer to a component of a node configured to connect the rest of the node to an interface. A node may have a fixed set of ports that can be selectively connected to particular interfaces. Each port of a node may have a unique identity, which may be represented by a port number. As used herein, the terms "ingress port," "entry port," and their equivalents, can refer to a port at which a packet enters a node. As used herein, the terms "egress port," "exit port," and their equivalents, can refer to a port at which a packet exits a node. In various implementations, each one of the data packets may have a header that indicates the IP address of the source 102 as the source and an IP address of the destination 106 as the destination.

Upon receiving an example data packet 108 from the source 102, the nodes 104-A to 104-E within the network will attempt to direct the data packet 108 through the network to the destination 106. For instance, node A 104-A may receive the data packet 108, identify the data packet 108 is addressed to the destination 106, identify that node C 104-C is in a direction of the destination 106, and forward the data packet 108 to node C 104-C. In some cases, node C 104-C, in turn, may receive the data packet 108, identify that the data packet 108 is addressed to the destination 106, identify that node D 104-D is in a direction of the destination 106, and forward the data packet 108 to node D 104-D. In some implementations, the data packet 108 may traverse a path between the source 102 and the destination 106 that includes at least a portion of the nodes 104-A to 104-E. As used herein, the terms "path," "network path," and their equivalents, can refer to a specific sequence of nodes and/or interfaces over which a packet traverses. A path may be defined between at least two nodes. In some cases, a path of a packet transmitted from a first node to a second node may be defined according to an identity of the first node, an identity of the second node, as well as any sequence of intermediary nodes and/or interfaces over which the packet travels from the first node to the second node.

However, in some implementations, one of the nodes 104-A to 104-E may receive the data packet 108 and refrain from forwarding the data packet 108. The data packet 108 may include an expiration field indicating a limit to the lifetime of the data packet 108 within the network comprised of the nodes 104-A to 104-E. As used herein, the term "expiration field" can refer to a field in a header of a data packet that indicates how much time and/or how many remaining hops are in the data packet's lifetime as it traverses through the network. Some examples of an expiration field include a TTL, a hop limit, a counter, a timestamp, or the like. As the data packet 108 is relayed through the network by the nodes 104-A to 104-E, the expiration field of the data packet 108 can be decremented. In some examples, each of the nodes 104-A to 104-E may decrement the expiration field in response to receiving the data packet 108. For instance, if the expiration field is a counter (e.g., a TTL, a hop limit, or the like), Node C 104-C may decrease a value of the counter by one in response to receiving the data packet 108. If one of the nodes 104-A to 104-E identifies that the expiration field indicates that the lifetime of the data packet 108 is over (e.g., the value of the counter is zero), the node may discard the data packet 108 and/or refrain from forwarding the data packet 108 in a route toward the destination 106. For example, if Node C 104-C decreases a value of the counter and identifies that the value of the counter has reached zero, Node C 104-C may refrain from forwarding the data packet 108 to node D 104-D or to any other node in the network and may discard the data packet 108.

In various implementations, the expiration field may provide a benefit for the network. Routing patterns of a network may change over time. For instance, the nodes 104-A to 104-E may include at least one load balancer that may forward data packets along different routes through the network according to real-time congestion conditions in the network. In some cases, nodes may be added to the network, thereby generating new routes for data packets through the network. As conditions of the network change over time, the nodes 104-A to 104-E may change their individual routing techniques according to the changing conditions. For instance, each one of the nodes 104-A to 104-E may store a routing table that indicates which egress ports through which data packets should be forwarded according to their destinations. As a condition of the network changes, the nodes 104-A to 104-E may update their routing tables. However, in some cases, the nodes 104-A to 104-E may inadvertently generate routing loops through the network, particularly as their routing techniques change over time. As used herein, the term "routing loop," and its equivalents, can refer to two or more nodes including a first node and at least one second node, wherein a data packet forwarded by the first node to the second node(s) will be forwarded back to the first node, either directly or via other nodes in the network. A data packet forwarded through a routing loop can expend network resources without arriving at its destination. An expiration field in a data packet may prevent a packet from being forwarded endlessly through a routing loop, thereby preventing the data packet from indefinitely expending network resources.

The expiration of a data packet received by the nodes 104-A to 104-E may occur due to reasons other than the presence of routing loops in the network. For instance, a "traceroute" technique can be used to generate expired packets. Some implementations of traceroute are specified according to an IP protocol, such as IPv4 or IPv6. A traceroute packet may be a data packet designed to measure transit routes and/or transit delays across the network. For instance, a testing node may generate a series of data packets, addressed to the same destination, with different expiration field values. These data packets may be referred to as "traceroute packets." When any one of the data packets is routed through the network, a receiving node may identify that the data packet is expired using its expiration field and may return an ICMP message (e.g., a Time Exceeded message) to the testing node. Based on the ICMP messages returned in response to the data packets, the testing node can identify latency through one or more network paths between the testing node and the destination, as well as identify the nodes along the network path(s). Thus, an expired data packet received by the nodes 104-A to 104-E could be a traceroute packet. In some cases, expired data packets may be the result of nefarious activity. For instance, an expired data packet received by the nodes 104-A to 104-E may be the result of a Denial of Service (DoS) attack on the network. As used herein, the term "DoS" attack" may refer to a process by which at least one entity floods a network with superfluous data packets that can exhaust resources (e.g., bandwidth, capacity, or the like) of the network. In some cases, a DoS attack can interrupt services of the network for legitimate data traffic through the network.

In various implementations of the present disclosure, probes can be used to identify the reasons why one or more data packets have expired in the network. For instance, in response to identifying that data packet 108 is expired, node C 104-C may generate a probe 110. The probe 110 may be a data packet. In some cases, the probe 110 is a UDP packet, regardless of the format of the data packet 108. The probe 110 may be a diagnostic packet.

Like the data packet 108, the probe 110 may be addressed to the destination 106. However, instead of indicating the source 102 as its originator, node C 104-C may generate the probe 110 to indicate a probe-specific address associated with node C 104-C as the source of the probe 110. The probe-specific address may be different than the IP address of node C 104-C, for instance. In some cases, the probe 110 may carry a limited amount of payload data to reduce the burden of the probe 110 on the network. Node C 104-C may forward the probe 110 on a route toward the destination 106. In various implementations, the expiration field of the probe 110 may be initialized at a predetermined value, such as 255. If the probe 110 is received by the destination 106, then the destination 106 may ignore and discard the probe 110. However, there may be scenarios (e.g., a routing loop) that can prevent the destination 106 from receiving the probe 110.

Node C 104-C may identify the presence of a routing loop in the network in response to receiving the probe 110 from another node in the network. For instance, node C 104-C may forward the probe 110 to node D 104-D, which may forward the probe 110 to node B 104-B, which may forward the probe 110 to node A 104-A, which may forward the probe 110 back to node C 104-C. The routing loop may include node C 104, C, node D 104-D, node B 104-B, and node A 104-A.

In various cases, node C 104-C may identify a size of the routing loop based on the expiration field of the probe 110 as-received. For example, node C 104-C may subtract the expiration field of the probe 110 as-received from the predetermined value of the expiration field of the probe 110 as-generated. For instance, if the expiration field of the probe 110 was initialized at a value of 255, the probe 110 was received with an expiration value of 252, and 255-252=3, node C 104-C may identify that the routing loop includes three other nodes (e.g., node D 104-D, node B 104-B, and node A 104-A) in the network.

In some cases, node C 104-C may identify the other nodes in the routing loop based on the probe 110. In various implementations, at least one of the nodes 104-A, 104-B, or 104-D may be configured to add node-identifying information to the probe 110 before forwarding the probe 110 to another node. For instance, at least one of the nodes 104-A, 104-B, or 104-D may be configured to amend the probe 110 to include In-situ Operations, Administration, and Management (IOAM) information associated with the corresponding node(s). In various cases, node C 104-C may serve as an IOAM encapsulating node. IOAM provides mechanisms by which each node transferring a data packet through a network can add metadata to the data packet. In some cases, this metadata can be used to derive the path through which the data packet travels through the network. Some alternatives to IOAM, such as In-band Network Telemetry (INT), In-band Flow Analyzer (IFA), and In-situ Flow Information Telemetry (IFIT), provide similar functionality. In response to receiving the probe 110, node C 104-C may identify at least one of the nodes 104-A, 104-B, or 104-D whose node-identifying information is included in the probe 110. Accordingly, node C 104-C may identify at least one of the nodes 104-A, 104-B, or 104-D in the routing loop.

In various implementations, node C 104-C may determine whether the routing loop is a persistent routing loop or a temporary routing loop. A "persistent" routing loop may correspond to a routing loop that lasts for at least a threshold time period (e.g., one minute, two minutes, three minutes, or the like). A "temporary" routing loop may correspond to a routing loop that lasts for less than the threshold time period. In particular examples, node C 104-C may receive multiple expiring packets (e.g., including the data packet 108) in the same data flow. Node C 104-C may identify that the packets are part of the same data flow because the packets may be associated with the same flow identifier. A flow identifier may include at least one element of a 5-tuple associated with the flow, such as a source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)) one or more packets in the flow. In various examples, a flow identifier can include an IPv6 flow label and/or one or more fields within a payload of at least one packet in the flow.

In various examples, node C 104-C may generate multiple probes (e.g., including probe 110) respectively corresponding to at least a portion of the expiring packets. For instance, node C 104-C may generate a probe in response to every expired data packet in the flow, every other expired data packet in the flow, every ten expired data packets in the flow, every hundred expired data packets in the flow, or the like. In some examples, node C 104-C may generate a probe in response to an expiring data packet in the flow no more than once every ten milliseconds, no more than once every 100 milliseconds, or the like. Accordingly, in some implementations, the probes may be prevented from flooding the network and from substantially taking up available capacity in the network. In some cases, node C 104-C may include a counter that identifies how many expired packets associated the flow have been received by node C 104-C, how many probes associated with the flow have been generated and forwarded by node C 104-C, or the like.

As long as node C 104-C receives the probes, node C 104-C may identify that at least one routing loop is persisting in the network. If each one of the received probes is generated and received with the same expiration fields and/or with the same node-identifying information, node C 104-C may identify that the same routing loop is persisting. If the received probes are generated with the same expiration fields but are received with different expiration fields, node C 104-C may identify that different routing loops have been present in the network. If the received probes are received with different node-identifying information, node C 104-C may identify that different routing loops have been present in the network.

In some cases, node C 104-C may inject the probes in the network and receive an initial set of the probes, indicating that a routing loop is initially present. However, node C 104-C may determine that a subsequent set of the probes have not been returned to node C 104-C (e.g., within a predetermined time period of being inserted into the network), thereby indicating that the routing loop may have been resolved. Accordingly, node C 104-C may determine that the routing loop was temporary.

In some examples, node C 104-C may use the probe 110 to identify other issues with the network. For instance, node C 104-C may receive multiple expired packets (e.g., including data packet 108) from at least one source, generate and insert probes (e.g., including probe 110) into the network based on the expired packets, and may identify that the probes have not been returned to node C 104-C (e.g., within a predetermined time period of being inserted into the network). Node C 104-C may therefore determine the absence of a routing loop in the network. However, if more than a threshold number of expired packets are received by node C 104-C, or if more than a threshold number of probes are generated and not returned to node C 104-C (e.g., within a particular time interval, such as one minute, two minutes, or some other time interval), node C 104-C may identify that the expired packets may be indicative of a DoS attack and/or a malfunctioning application in the network. Accordingly, in some implementations, node C 104-C may use the probe 110 to identify that a possible DoS attack is targeting the network.

In various implementations, node C 104-C may generate a report 112 based on at least one of the data packet 108, the probe 110, or the reason that node C 104-C has identified as causing the expiration of the data packet 108. The report 112 may include an identifier of node C 104-C, such as an IP address and/or node identification (ID) that uniquely identifies node C 104-C among the network including nodes 104-A to 104-E. In some cases, the report 112 may include a flow identifier of the data packet 108 (e.g., an identifier of the source 102, an identifier of the destination 106, or the like). According to some implementations, the report 112 may indicate a time at which the data packet 108 is received by node C 104-C. In various examples, the report 112 may include a time at which the probe 110 is injected into the network. The report 112 may indicate a time at which node C 104-C receives the probe 110 in the network. In some cases, the report 112 may indicate a difference between the expiration field of the probe 110 as-generated and the expiration field of the probe 110 as-received by node C 104-C, which can be used to derive the size of a routing loop in the network. The report 112 may include node-identifying information in the probe 110 as-received by node C 104-C, such as IOAM metadata indicating nodes in the routing loop. In various implementations, the report 112 may include how many expired packets node C 104-C has received (e.g., within a particular time interval, from a particular source, etc.), how many probes node C 104-C has generated and forwarded (e.g., within a specified time interval, associated with a particular flow, etc.), or the like.

In various implementations, node C 104-C may diagnose an issue with the network based on the probe 110 and indicate the issue in the report 112. For instance, the report 112 may be generated to indicate whether node C 104-C has determined that a routing loop is present in the network, whether a routing loop is absent, whether the routing loop is persistent or temporary, a size of the routing loop, at least one identity of a node in the routing loop, that a possible DoS attack is targeting the network, or a malfunctioning application is operating within the network.

Node C 104-C may transmit the report 112 to an administrator 114. In various examples, the report 112 may be transmitted over the control plane. The administrator 114 may include at least one device configured to receive reports (including the report 112) from multiple nodes (including node C 104-C) in the network. In some cases, the administrator 114 may diagnose the issue (e.g., a persistent routing loop, a temporary routing loop, a possible DoS attack, malfunctioning application, or the like) with the network based on information within the report 112 using any of the techniques described above with reference to node C 104-C. In various examples, the report 112 itself may identify the issue, which may have been diagnosed by node C 104-C. In various implementations, the administrator may identify the issue with the network based on the report 112.

According to some examples, multiple nodes 104-A to 104-E in the network may receive expired packets, generate probes, and transmit reports to the administrator 114. The administrator 114 may diagnose issues with the network based on patterns identified with the reports from the multiple nodes 104-A to 104-E in the network. For instance, the administrator 114 may identify that a routing loop is present in the network includes node A 104-A, node B 104-B, node C 104-C, and node D 104-D, in response to receiving reports from node A 104-A, node B 104-B, node C 104-C, and node D 104-D indicating probes that were returned to node A 104-A, node B 104-B, node C 104-C, and node D 104-D during a similar time frame.

By receiving reports based on probe packets generated by the multiple nodes 104-A to 104-C in the routing loop, the administrator 114 may identify the nodes within the routing loop, even without the use of IOAM information in the probe packets. The probe packets may be simpler and smaller due to the omission of IOAM information, which may beneficially reduce the impact of the probe packets on the network. In some implementations, when the multiple nodes 104-A to 104-C generate probe packets, the probe packets can contribute to a non-insignificant amount of additional data traffic within the network.

In order to minimize this additional data traffic, one or more of the individual nodes 104-A to 104-C may adjust a probe generation rate (e.g., a number of probe packets injected into the network per a time interval) in response to a number of probe packets generated by other nodes in the network. For instance, an individual node (e.g., 104-C) can monitor probe packets being transmitted through the individual node from other nodes (e.g., nodes 104-A, 104-B, or 104-D) and adjust the probe generation rate based on the number of probe packets the individual node (104-C) receives over time. In some cases, if the individual node 104-C identifies that the number of received probe packets associated with the network is relatively high, then the individual node 104-C may be configured to inject probe packets into the network at a relatively low rate. In some implementations, if the individual node 104-C identifies that the number of received probe packets associated with the network is relatively low, then the individual node 104-C may be configured to inject probe packets into the network at a relatively high rate.

In various implementations, the administrator 114 may additionally perform at least one action to resolve the issue in the network. In various implementations, the administrator 114 may generate an alert 116 identifying the issue. The administrator 114 may output the alert 116 on an output device (e.g., a screen, a haptic device, a speaker, or the like) to inform a user of the issue with the network. In some cases, the administrator 114 may output the alert 116 as a push notification, e-mail, text message, or the like, which can be output on a device associated with the user (e.g., a mobile phone, laptop, or the like). The alert 116 may specify which of the nodes 104-A to 104-E in the network are implicated in the issue, at least one source (e.g., source 102) of an identified DoS attack, and/or any other information that can assist the user with resolving the issue.

According to various implementations, an issue with the network can be identified and reported to a user substantially in real time. In various examples, the user may identify issues with the network (e.g., persistent routing loops, temporary routing loops, DoS attacks, etc.) without sorting through network logs and other post-hoc reports. Accordingly, the issues can be identified and resolved efficiently.

In various examples, using the environment 100, routing loops and/or DoS attacks can be diagnosed within the network within milliseconds, or even microseconds, of their occurrence in the network. In contrast, identifying routing loops using post-hoc methods can take at least minutes. Accordingly, various implementations described herein can be used to diagnose issues in a network more efficiently than other diagnostic techniques.

Figure 2A:
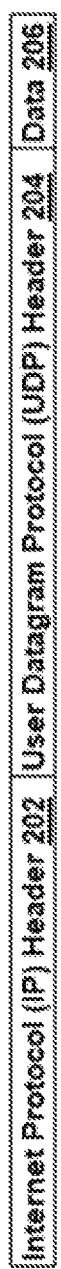

FIGS. 2A to 2D illustrate various elements of example probe packets. FIG. 2A illustrates an overall structure of an example probe packet 200. The probe packet 200 may be the probe 110 described above with reference to FIG. 1, in some examples. For instance, a network node may generate a probe packet 200 in response to receiving an expired data packet (e.g., data packet 108, described above with reference to FIG. 1).

As illustrated, the probe packet 200 includes an IP header 202. The IP header 202 may be an IPv4 header, an IPv6 header, or the like. If the probe packet 200 is returned to the network node, the network node may use the IP header 202 to identify that the probe packet 200 originated from the network node as well as other information about a routing loop in a network including the network node.

The IP header 202 may specify that the probe packet 200 has a UDP protocol. Accordingly, the probe packet 200 may further include a UDP header 204. The UDP header 204 can be used to ensure that the probe packet 200 is discarded upon reaching a destination specified in the IP header 202.

In addition, the probe packet 200 may include a limited amount of data 206. In some cases, an amount of the data 206 may be minimized in order to reduce the burden of the probe packet 200 on the network. In various examples, the data 206 may include at least a portion of the expired packet.

FIG. 2B illustrates an example IPv4 header 208 of the probe packet 200. The IPv4 header 208 may be used as the IP header 202. In general, an IPv4 header includes thirteen fields and one optional field. As illustrated, the IPv4 header 208 includes multiple fields, such as a version field 210, an Internet Header Length (IHL) field 212, a Differentiated Services Code Point (DSCP) field 214, an Explicit Congestion Notification (ECN) field 216, a total length field 218, an identification field 220, a flags field 222, a fragment offset field 224, a TTL field 226, a protocol field 228, a header checksum field 230, a source address field 232, a destination address field 234, and an options field 236. The options field 236 is an optional field.

The version field 210 may be a four-bit field. In the IPv4 header 208, the version field 210 is equal to 4.

The IHL field 212 may be a four-bit field. The IHL field 212 may specify the length of the IPv4 header 208. A minimum value of the IHL field 212 may be equal to five. When the IHL field 212 is equal to five, it may indicate that the length of the IPv4 header 208 is 160 bits or 20 bytes.

The DSCP field 214 may indicate a Type of Service (ToS) of the probe packet 200. For instance, the DSCP field 214 may specify a differentiated service (DiffServ).

The ECN field 216 may provide a notification of end-to-end network congestion. In various implementations, the ECN field 216 is optional, and may be omitted from the IPv4 header 208.

The total length field 218 may be a 16-bit field that defines a size of the entire probe packet 200. A minimum size of the probe packet 200 that is identified in the total length field 218 may include a length of both the IPv4 header 208 and the UDP header 204.

The identification field 220 may be used to identify a group of fragments of an IP datagram. The flags field 222 may be a three-bit field that is used to control or identify the fragments. A first bit of the flags field 222 may be reserved and equal to zero, a second bit may indicate that fragmentation can be used to route the probe packet 200, and the third bit indicates that more fragments can be used to route the probe packet 200. In various implementations, the flags field 222 may indicate that the probe packet 200 may be an unfragmented packet. The fragment offset field 224 may be a 13-bit field that specifies an offset of a particular fragment relative to a beginning of an original unfragmented IP datagram.

The TTL field 226 may be an eight-bit field that specifies a value of a maximum number of hops (or a maximum number of times) that the probe packet 200 can continue being routed through the network. In particular implementations, the TTL field 226 may be set to a predetermined value. In some cases, all probe packets (e.g., including the probe packet 200) generated by the network node may have the same TTL value. For instance, as illustrated in FIG. 2B, the TTL field 226 may be set to a maximum value of 255.

The protocol field 228 may define the protocol used in the rest of the probe packet 200. In various cases, the protocol field 228 may specify a UDP protocol. For instance, the protocol field 228 can specify a protocol number of 17, which is the protocol number of the UDP protocol.

The checksum field 230 may be a 16-bit field that can be used to check of errors in the header as it is transferred through the network. When the probe packet 200 is received by a particular node, the particular node may calculate a checksum for the header and compare the calculated checksum to the checksum field 230. If the values are mismatched, the particular node discards the probe packet 200. If the values are matched, the particular node may process and/or forward the probe packet 200.

The source address field 232 may specify an IP address identifying the network node generating the probe packet 200. In some cases, the network node may have a first IP address by which data can be forwarded to the network node, and a second IP address reserved exclusively for probe packets like the probe packet 200. According to various examples, the source address field 232 may identify the node generating the probe packet 200. For instance, the source address field 232 may indicate a probe-specific node ID. The probe-specific node ID may be exclusively used by the node to indicate probe packets like the probe packet 200. Accordingly, the probe packet 200 can be distinguished (e.g., by the node or other nodes in the network) from other data packets transmitted through the network.

The destination address field 234 may specify an IP address. In various instances, the destination address field 234 may identify the destination of the expired packet received by the node. For example, the destination address field 234 may include an IP address of the destination of the expired packet. Accordingly, as the probe packet 200 may be forwarded on a route through the network that would have been taken by the expired packet if the packet had not expired.

The options field 236 may, in some cases, be omitted from the IPv4 header 208. In various examples, the options field 236 may be substituted for necessary padding to ensure that the IPv4 header 208 contains an integer number of 32-bit words.

FIG. 2C illustrates an example IPv6 header 238 of the probe packet 200. The IPv6 header 238 may be used as the IP header 202. In the illustrated example, the IPv6 header 238 includes a version field 240, a traffic class field 242, a flow label field 244, a payload length field 246, a next header field 248, a hop limit field 250, a source address field 252, and a destination address field 254. The IPv6 header 238 may have a total size of 40 octets, or 320 bits.

The version field 240 may be a 4-bit field that specifies a version of the IPv6 header 238. For instance, the version field 240 may include a bit sequence of "0110," which may specify that the version of the IPv6 header 238 is IPv6.

The traffic class field 242 may include two values in eight bits. The first six bits of the traffic class field 242 may include a class of the probe packet 200. For instance, the first six bits may indicate a differentiated service of the probe packet 200. The final two bits can specify an ECN field of the probe packet 200.

The flow label field 244 may be a 20-bit field that can be used to indicate whether the packet 200 should be routed along a particular network path. In various implementations, the flow label field 244 has a value that is set to zero.

The payload length field 246 may be a 16-bit field that specifies the size of the payload of the probe packet 200. For instance, the payload length field 246 may specify a length of the UDP header 204 and the data 206 in the probe packet 200.

The next header field 248 may specify a type of a next header in the probe packet 200. In various examples, the next header field 244 may specify a UDP protocol. For instance, the next header field 244 may specify a protocol number of 17, which is the protocol number of the UDP protocol.

The hop limit field 250 may specify a number of remaining hops (e.g., nodes) through the network that the probe packet 200 can traverse before it should be discarded. In various implementations, the hop limit field 250 may be set to a predetermined value. In some cases, all probe packets (e.g., including the probe packet 200) generated by the network node may have the same hop limit value. For instance, as illustrated in FIG. 2C, the hop limit field 250 may be set to a maximum value of 255.

The source address field 252 may specify an IP address identifying the network node generating the probe packet 200. In some cases, the network node may have a first IP address by which data can be forwarded to the network node, and a second IP address reserved exclusively for probe packets like the probe packet 200. According to various examples, the source address field 252 may identify the node generating the probe packet 200. For instance, the source address field 252 may indicate a probe-specific node ID. The probe-specific node ID may be exclusively used by the node to indicate probe packets like the probe packet 200. Accordingly, the probe packet 200 can be distinguished (e.g., by the node or other nodes in the network) from other data packets transmitted through the network.

The destination address field 254 may specify an IP address. In various instances, the destination address field 254 may identify the destination of the expired packet received by the node. For example, the destination field 254 may include an IP address of the destination of the expired packet. Accordingly, as the probe packet 200 may be forwarded on a route through the network that would have been taken by the expired packet if the expired packet was not expired.

FIG. 2D illustrates an example of the UDP header 204. The UDP header 204 may include a source port field 256, a destination port field 258, a length field 260, and a checksum field 262.

The source port field 256 may be a 16-bit field identifying a port of the network node that has generated the probe packet 200. In some cases, the source port field 256 may be set to zero.

The destination port field 258 may be a 16-bit field identifying a port of, or an action that should be performed by, a destination of the probe packet 200. The destination port field 258 may be set to a value corresponding to a discard protocol, which instructs the destination of the expired packet and the probe packet 200 to discard the probe packet on receipt. This prevents the destination from attempting to process an unexpected probe packet. For instance, as illustrated in FIG. 2D, the destination port field 258 may be set to a value equal to 9, which is the UDP port number for the Discard Protocol (e.g., as specified in Internet Engineering Task Force (IETF) Request for Comments (RFC) 863).

The length field 260 may be a 16-bit field specifying the length of the UDP header 204 and the data 206. If the data 206 is omitted or empty, the length field 260 may specify a length of 8 bytes.

The checksum field 262 may be a 16-bit field used to check for errors in the UDP header 204 and/or the data 206. In some cases, the checksum field 262 is optional, and can carry only zeroes. For instance, the checksum field 262 may be optional if the IP header 202 is an IPv4 header. In some cases, the checksum field 262 is mandatory. For example, the checksum field 262 may be mandatory if the IP header 202 is an IPv6 header. In some implementations, a probe packet may have an invalid checksum field 262, which can ensure that a receiving node ignores the probe packet as it is transmitted through a network. Accordingly, the invalid checksum field 262 can be used in addition to, or as an alternative to, the destination port field 258 being defined as a value equal to 9.

Figure 3:
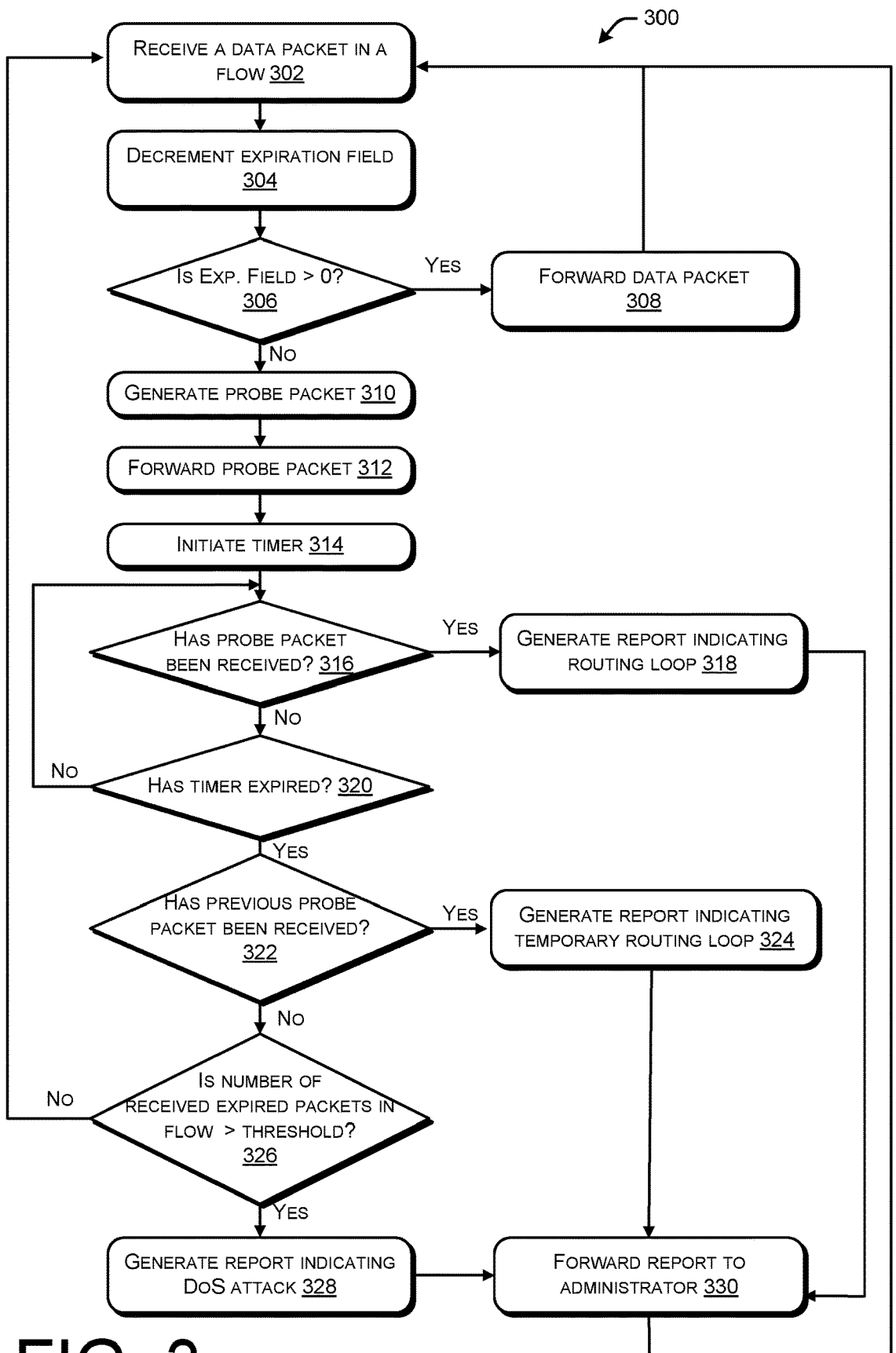
FIG. 3 illustrates an example process for generating probes and identifying issues within a network.

FIG. 3 illustrates an example process 300 for generating probes and identifying issues within a network. The process 300 may be performed by a network node, such as one of the network nodes 104-A to 104-E described above with reference to FIG. 1.

At 302, a data packet in a flow may be received. In various implementations, the data packet may be an IP data packet. For instance, the data packet may include an IPv4 header, an IPv6 header, or the like. In various implementations, the flow may include multiple data packets carrying the same type of data traversing a network from a source to a destination. The data packet received at 302 may indicate a flow identifier of the flow. For instance, the data packet may indicate at least one of an identifier of the source (e.g., an IP address of the source) or an identifier of the destination (e.g., an IP address of the destination).

At 304, an expiration field of the data packet may be decremented. The expiration field may be a field in the header of the data packet. For instance, the expiration field may be a TTL field, a hop limit field, or the like. In various implementations, a value of the expiration field of the data packet may be decremented by one.

At 306, the process 300 may include determining whether the expiration field is greater than 0. For example, the TTL field or hop limit field may be evaluated.

If the expiration field is determined to be greater than 0 at 306, the process 300 proceeds to 308. At 308, the data packet is forwarded to its destination. In various implementations, the process 302 may return to 302.

If, on the other hand, the expiration field is determined to not be greater than 0 at 306, the process 300 continues to 310. At 310, a probe packet may be generated. In various implementations, the probe packet may be a UDP packet, regardless of a type of the data packet received at 302. In some cases, a TTL or hop limit field of the probe packet may be initialized at a predetermined value, such as 255. A header of the probe packet may indicate the destination of the flow as the destination of the probe packet. The header may indicate a probe-specific address as the source of the probe packet. The probe-specific address may be specific to the entity performing the process 300.

According to some implementations, the entity performing the process 300 may receive multiple data packets in the data flow, but only perform 310 on a subset of the expired packets. For instance, a probe packet may be generated for every expired packet received in the data flow, every other expired data packet received in the data flow, every ten expired data packets received in the data flow, every 20 expired data packets in the data flow, or the like. In some cases, the entity performing the process 300 may limit the time between probe packets (corresponding to the data flow or corresponding to any data flow) it generates. For instance, no more than one probe packet may be generated every millisecond, every ten milliseconds, every 20 milliseconds, or the like.

At 312, the probe packet may be forwarded. In various implementations, the probe packet may be forwarded to the destination of the flow. The expired data packet may be discarded. In some cases, an ICMP packet may additionally be generated and returned to the source of the packet. The probe packet may propagate through the network. The behavior of the probe packet, and the network in response to forwarding the probe packet, may indicate one or more issues with the network.

At 314, a timer may be initiated. In various implementations, the timer may be initiated to count down from, or up to, a wait time. The wait time may be one millisecond, ten milliseconds, 100 milliseconds, 1000 milliseconds, one second, two seconds, ten seconds, or any other limited time interval. The timer may be initiated in response to forwarding the probe packet.

At 316, the process 300 may include determining whether the probe packet has been received. A number of data packets may be received by the entity performing the process 300. The entity may determine whether any of the data packets is the probe packet by inspecting the source address of the data packets. If the source address of one of the data packets is determined to be the probe-specific address, the data packet may be determined to be the probe packet. In some cases, if the entity performing the process 300 is deploying multiple probe packets, the entity may identify the packet as the probe packet if the destination address of the packet is the destination of the flow. In some cases, the entity performing the process 300 may track (e.g., count) a number of probe packets that are generated and/or received for an individual data flow. In various implementations, the destination address of various packets transmitted through the network, as well as the identification of any of the packets as probe packets, can be used to identify the probe packets associated with individual data flows. In some examples, the entity performing the process 300 can track the number of probe packets that are associated with individual data flows, in order to distinguish between different probe packets throughout the network.

If the probe packet is determined to have been received at 316, the process 300 may proceed to 318. At 318, a report indicating the presence of a routing loop may be generated. In some implementations, the report may be generated to indicate a size of the routing loop. The size of the routing loop can be determined, for instance, by subtracting a value of the expiration field of the probe packet as-received from the value of the expiration field of the probe packet as-transmitted. In some cases, the report may be generated to indicate identities of one or more nodes in the routing loop. For example, one or more of the nodes in the routing loop may add node-identifying information (e.g., IOAM data) to the probe packet while relaying the probe packet through the network. Upon receiving the probe packet, the entity performing the process 300 may determine the one or more nodes in the routing loop based on the node-identifying information in the probe packet as-received.

If, however, the probe packet is determined to have not been received at 316, the process 300 may proceed to 320. At 320, the process 300 includes determining whether the timer has expired. If the timer is determined to have not expired at 320, the process 300 returns to 316.

If the timer is determined to have expired at 320, the process 300 proceeds to 322. At 322, the process 300 includes determining whether a previous probe packet associated with the flow has been received. For instance, the entity performing process 300 may have received a previous expired data packet in the flow, generated a previous probe packet based on the previous expired data packet, and may have determined to have received the previous probe packet. The receipt of the previous probe packet may have indicated that a routing loop in the network was present at a previous time.

If the previous probe packets are determined to have been received at 322, the process 300 continues to 324. At 324, a report indicating a temporary routing loop may be generated. By not receiving the probe packet within the wait time, the routing loop present at the previous time may have been resolved. In some cases, the report may include information identifying the routing loop that was present at the previous time. For instance, the report may include at least one of a size of the previous routing loop, an identity of one or more of the nodes in the previous routing loop, or the like.

If the previous probe packets are determined to have not been received at 322, the process 300 continues to 326. At 326, the process 300 includes determining whether the number of received expired packets in the flow exceed a threshold.

If the number of received expired packets in the flow does not exceed the threshold, the process 300 may return to 302. In some cases, the expired packet may not have been indicative of an issue in the network that can be resolved with administrator intervention. For instance, the expired packet may have been the result of a traceroute process.

However, if the number of expired packets in the flow exceeds the threshold, the process 300 may continue to 328.

At 328, a report may be generated indicating a DoS attack and/or malfunctioning application in the network. The threshold may be, for instance, 100, 1,000, 10,000, one million, or any other defined threshold. In various implementations, the report may indicate at least one of the source of the expired packet, the destination of the expired packet, the number of expired packets in the flow, or the like.

At 330, the process 300 may include forwarding any of the reports generated at 318, 324, or 328 to an administrator. In various implementations, a report may be forwarded via the control plane. In some cases, the administrator may receive reports from various nodes performing processes at least similar to the process 300. Accordingly, the administrator may identify issues with the network almost immediately after they are identified. In response to the performance of 330, the process 300 may return to 302. Accordingly, the process 300 may be performed cyclically.

Figure 4:
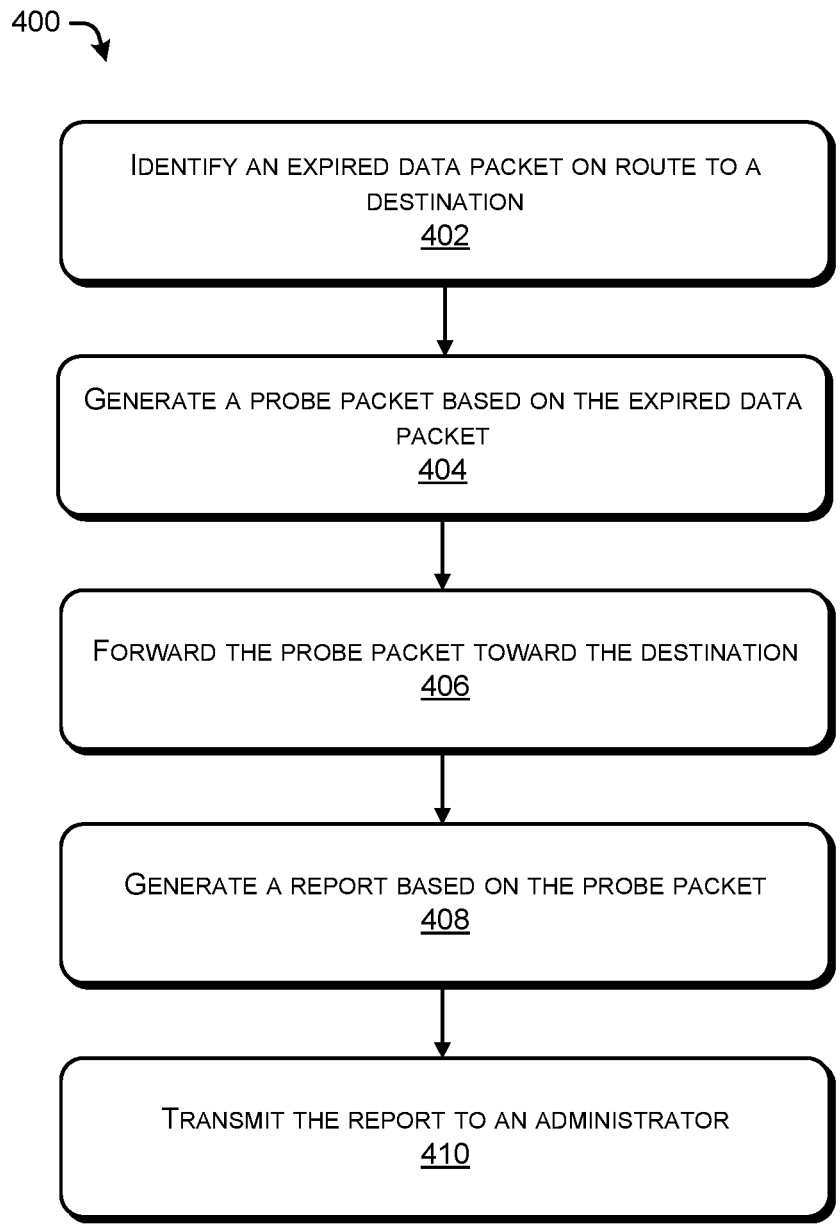
FIG. 4 illustrates an example process for generating probes to identify issues within a network.

FIG. 4 illustrates an example process 400 for generating probes to identify issues within a network. The process 300 may be performed by a network node, such as one of the network nodes 104-A to 104-E described above with reference to FIG. 1.

At 402, an expired data packet on route to a destination may be identified. In various implementations, the data packet may be received from a node in the network. The data packet can be an IP data packet, in some cases. For instance, the data packet may include an IPv4 header, an IPv6 header, or the like. In various implementations, the flow may include multiple data packets carrying the same type of data traversing a network from a source to a destination. The data packet may indicate a flow identifier of the flow. For instance, the data packet may indicate at least one of an identifier of the source (e.g., an IP address of the source) or an identifier of the destination (e.g., an IP address of the destination).

In some implementations, an expiration field of the data packet may be decremented. The expiration field may be a field in the header of the data packet. For instance, the expiration field may be a TTL field, a hop limit field, or the like. In various implementations, a value of the expiration field of the data packet may be decremented by one. The data packet may be determined to be expired if the expiration field does not exceed 0. For example, the TTL field or hop limit field of the data packet may be evaluated. If the expiration field is equal to zero, the data packet may be determined to be expired.

At 404, a probe packet is generated based on the expired data packet. In various implementations, the probe packet may be a UDP packet, regardless of a type of the expired data packet received. In some cases, a TTL or hop limit field of the probe packet may be initialized at a predetermined value, such as 255. A header of the probe packet may indicate the destination of the flow as the destination of the probe packet. The header may indicate a probe-specific address as the source of the probe packet. The probe-specific address may be specific to the entity performing the process 400.

At 406, the probe packet is forwarded toward the destination. In various implementations, the probe packet may be forwarded to the destination of the flow. The expired data packet may be discarded. In some cases, an ICMP packet may additionally be generated and returned to the source of the packet. The probe packet may propagate through the network. The behavior of the probe packet, and the network in response to forwarding the probe packet, may indicate one or more issues with the network.

At 408, a report may be generated based on the probe packet. In some implementations, 408 may include determining whether the probe packet has been received. A number of data packets may be received by the entity performing the process 300. The entity may determine whether any of the data packets is the probe packet by inspecting the source address of the data packets. If the source address of one of the data packets is determined to be the probe-specific address, the data packet may be determined to be the probe packet. In some cases, if the entity performing the process 400 is deploying multiple probe packets, the entity may identify the packet as the probe packet if the destination address of the packet is the destination of the flow.

If the probe packet is determined to have been received, a report indicating the presence of a routing loop may be generated. In some implementations, the report may be generated to indicate a size of the routing loop. The size of the routing loop can be determined, for instance, by subtracting a value of the expiration field of the probe packet as-received from the value of the expiration field of the probe packet as-transmitted. In some cases, the report may be generated to indicate identities of one or more nodes in the routing loop. For example, one or more of the nodes in the routing loop may add node-identifying information (e.g., IOAM data) to the probe packet while relaying the probe packet through the network. Upon receiving the probe packet, the entity performing the process 400 may determine the one or more nodes in the routing loop based on the node-identifying information in the probe packet as-received.

In various examples, a wait time may have expired without having received the probe packet. In some cases, the entity performing the process 400 may determine that a routing loop was previously identified in the network. For instance, the entity performing process 400 may have received a previous expired data packet in the flow, generated a previous probe packet based on the previous expired data packet, and may have determined to have received the previous probe packet. The receipt of the previous probe packet may have indicated that a routing loop in the network was present at a previous time.

If the previous probe packets are determined to have been received, a report indicating a temporary routing loop may be generated. By not receiving the probe packet within the wait time, the routing loop present at the previous time may have been resolved. In some cases, the report may include information identifying the routing loop that was present at the previous time. For instance, the report may include at least one of a size of the previous routing loop, an identity of one or more of the nodes in the previous routing loop, or the like.

If the probe packet has not been received within the wait time, and a number of expired packets in the flow exceeds a threshold, a report may be generated indicating a DoS attack. The threshold may be, for instance, 100, 1,000, 10,000, one million or any other defined threshold. In various implementations, the report may indicate at least one of the source of the expired packet, the destination of the expired packet, the number of expired packets in the flow, or the like.

Figure 5:
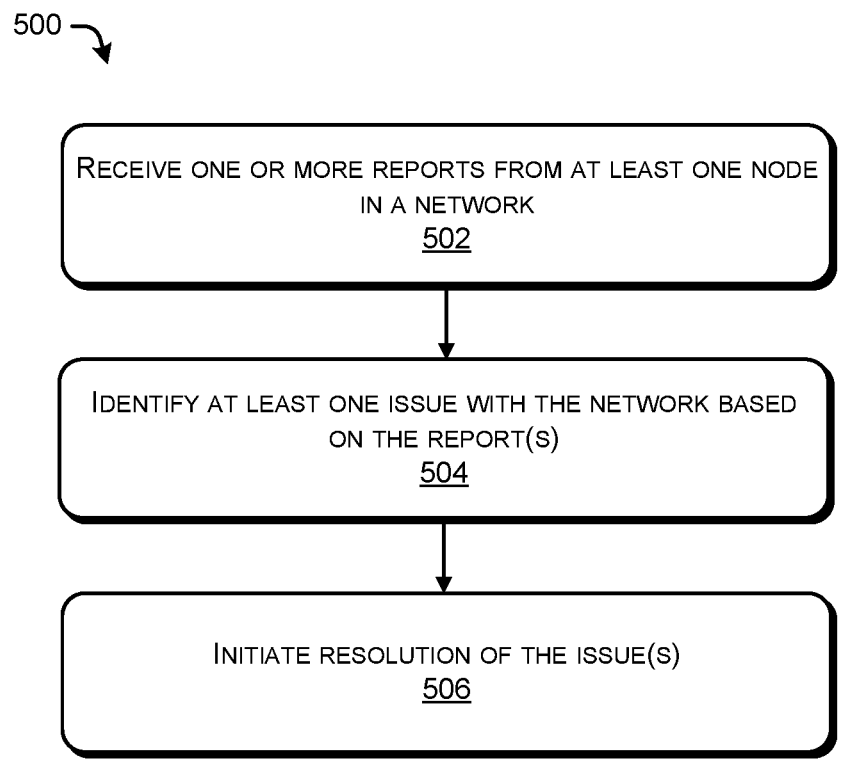
FIG. 5 illustrates an example process for resolving issues within a network.

At 410, the report may be transmitted to an administrator. In various implementations, a report may be forwarded via the control plane. In some cases, the administrator may receive reports from various nodes performing processes at least similar to the process 400. Accordingly, the administrator may identify issues with the network almost immediately after they are identified FIG. 5 illustrates an example process 500 for resolving issues within a network. In various implementations, the process 500 can be performed by an administrator, such as the administrator 114 described above with reference to FIG. 1.

At 502, one or more reports may be received from at least one node in a network. In various implementations, each report may indicate an issue with the network. For example, a report may indicate at least one of a current routing loop in the network, a persistent routing loop in the network, a temporary routing loop in the network, a DoS attack on the network, or the like. In some cases, a report may indicate behavior of at least one probe packet through the network. For instance, the report may indicate that a probe packet has been transmitted by and returned to a node in the network. In some cases, the report may indicate a data flow associated with the probe packet. For example, the probe packet may be generated based on an expired data packet in the data flow and the report may include at least one identifier of the data flow. In various implementations, the report may indicate a size of a routing loop and/or identities of one or more nodes in the routing loop. In some cases, the report may indicate a number of expired data packets that have been received by the node in a DoS attack, at least one source of the expired data packets in the DoS attack, at least one destination of the expired data packets in the DoS attack, or the like. In some cases, the report may indicate whether an application is suspected of operating in the network.

In some implementations, multiple reports can be received from multiple nodes in the network. According to some examples, multiple nodes in the network can begin injecting probe packets into the network in response to receiving expired data packets.

At 504, at least one issue with the network may be identified based, at least partly, on the report(s). In implementations in which the node(s) indicate the issue(s) in the report(s), the entity performing the process 500 may identify the issue(s) from the report(s). In implementations in which the node(s) indicate behavior about probe packet(s) through the network, the entity performing the process 500 may identify the issue(s) based on the report(s). For instance, if the entity receives a first report from a particular node indicating a routing loop, and then a second report from the particular node indicating the absence of the routing loop, the entity performing the process 500 may identify that the network had a temporary routing loop. If the entity receives a first report from a particular node indicating a routing loop, and then a second report from the particular node indicating the routing loop, the entity performing the process 500 may identify that the network has a persistent routing loop. In various implementations, if reports indicating a routing loop are received from multiple nodes in the network, the entity performing the process 500 may determine that the multiple nodes are part of the routing loop. In some cases, in which the entity receives multiple reports from one or more nodes indicating that the node(s) received multiple expired data packets with similar features (e.g., in the same flow, from the same source, from sources in the same IP address range, to the same destination, to destinations in the same IP address range, or the like), the entity may determine that the network is targeted by a DoS attack.

At 506, resolution of the issue(s) may be initiated. In various implementations, an alert may be output indicating the issue(s). The entity performing the process 500 may output the alert on an output device (e.g., a screen, a haptic device, a speaker, or the like) to inform a user of the issue(s) with the network. In some cases, the entity performing the process 500 may output the alert as a push notification, e-mail, text message, or the like, which can be output on a device associated with the user (e.g., a mobile phone, laptop, or the like). The alert may specify which of the nodes in the network are implicated in the issue, at least one source (e.g., source 102) of an identified DoS attack, and/or any other information that can assist the user with resolving the issue.

Figure 6:
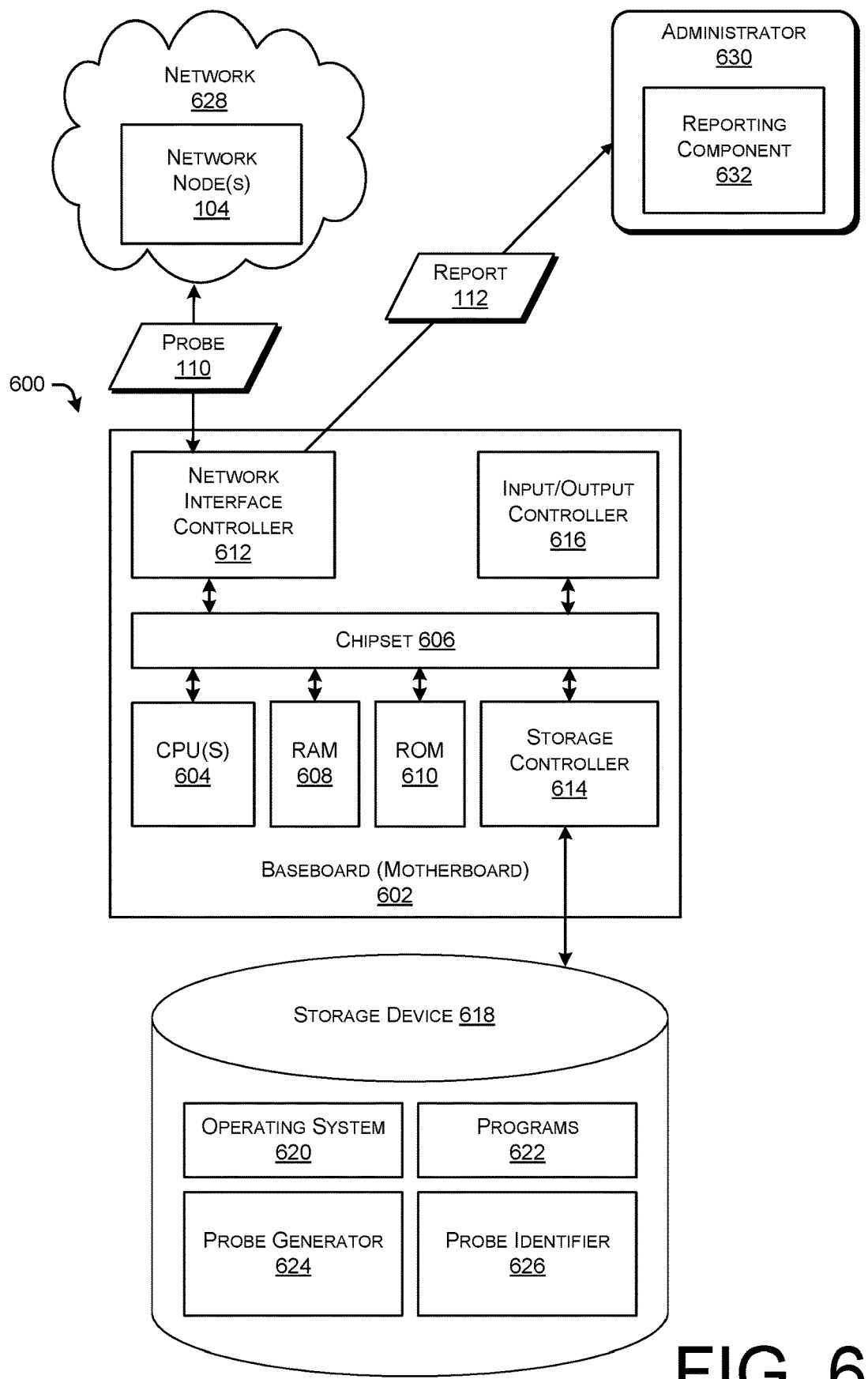
FIG. 6 shows an example computer architecture for a computer capable of executing program components for implementing the functionality described herein.

FIG. 6 shows an example computer architecture for a device 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The device 600 may, in some examples, correspond to a network node 204 described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a Random Access Memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 608. The chipset 606 can include functionality for providing network connectivity through a Network Interface Controller (NIC) 612, such as a gigabit Ethernet adapter. The NIC 612 is capable of connecting the computer 600 to other computing devices over the network 608. It should be appreciated that multiple NICs 612 can be present in the computer 600, connecting the computer to other types of networks and remote computer systems. In some instances, the NICs 612 may include at least on ingress port and/or at least one egress port.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by a network node (e.g., any one of nodes 104-A to 104-E), a source (e.g., source 102), a destination (e.g., destination 106), or administrator (e.g., administrator 114), may be supported by one or more devices similar to computer 600. Stated otherwise, some or all of the operations performed by a network node, collector, and/or central administrator, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 618 stores a probe generator 624 and a probe identifier 626. In some implementations, at least one of the probe generator 624 and the probe identifier 626 can be omitted. Using instructions stored in the probe generator 624, the CPU(s) 604 may be configured to generate a probe (e.g., the probe 110) and forward the probe 110 to one or more network nodes 104 in a network 628. Using instructions stored in the probe identifier 626, the CPU(s) 604 may receive a probe (e.g., the probe 110) and identify the presence of a routing loop in the network 628. In some cases, the probe identifier 626 may further cause the CPU(s) to generate a report 112 based on whether the probe 110 returned to the computer 600. In various implementations, the report 112 may identify one or more issues with the network 628 based on the behavior of the probe 110. Further, the probe identifier 626 may cause the CPU(s) 604 to transmit the report 112 to an administrator 630. The administrator 630 (which may be a computer with any of the functionality of the computer 600) may store, in its own storage device, a reporting component 632. The reporting component 632 may enable CPU(s) of the administrator 630 to report an issue with the network, or otherwise resolve the issue(S) with the network.

It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a computing node, the method comprising:
   identifying an expired data packet transmitted in a network and including an address associated with a destination node;
   generating a probe packet including the address associated with the destination node;
   sending the probe packet in the network towards the destination node;
   receiving the probe packet; and
   in response to receiving the probe packet:
      identifying In-situ Operations, Administration, and Management (IOAM) information in the probe packet;
      identifying one or more intermediary nodes in a routing loop based, at least in part, on the IOAM information; and
      generating a report identifying the one or more intermediary nodes in the routing loop; and
      transmitting, to an administrator, the report.

2. The method of claim 1, wherein identifying the expired data packet comprises:
   receiving the expired data packet comprising an expiration field value;
   decrementing the expiration field value of the expired data packet; and
   determining that the expiration field value is equal to zero.

3. The method of claim 2, wherein the expiration field is a Time to Live (TTL) field or a hop limit field.

4. The method of claim 1, wherein:
   a source address of the probe packet comprises a probe-specific identifier, and
   receiving the probe packet comprises identifying the probe-specific identifier in the probe packet.

5. The method of claim 1, wherein forwarding the probe packet comprises forwarding the probe packet comprising a first expiration field value, and
   the method further comprises:
      in response to receiving the probe packet, identifying a second expiration field value comprised in the probe packet;
      identifying a size of the routing loop by subtracting the second expiration field value from the first expiration field value; and
      generating the report to include the size of the routing loop.

6. The method of claim 1, wherein the expired data packet is a first expired data packet, the destination node is a first destination node, the address is a first address, the probe packet is a first probe packet, and the report is a first report, the method further comprising:
   identifying a second expired data packet including a second address associated with a second destination node;
   generating a second probe packet including the second address;
   sending the second probe packet in the network towards the destination node; and
   upon expiration of a wait time after forwarding the second probe packet without having received the second probe packet, transmitting, to the administrator, a second report indicating the absence of a second network loop.

7. The method of claim 6, wherein the data flow comprises the first expired data packet, the first destination node is the second destination node, and the second report indicates that the first network loop is a temporary network loop.

8. The method of claim 6, further comprising:
   identifying that a data flow comprises a threshold number of third expired data packets, the third expired data packets comprising the second expired data packet,
   wherein the second report indicates a Denial of Service (DoS) attack.

9. A system, comprising:
   at least one processor; and
   memory storing instructions that, when executed by the at least one processor, cause the at least one processor to perform operations comprising:
      identifying an expired data packet transmitted in a network and addressed to a destination;
      generating a probe packet addressed to the destination;
      forwarding the probe packet in the network;
      receiving the probe packet; and
      in response to receiving the probe packet:
         identifying In-situ Operations, Administration, and Management (IOAM) information in the probe packet;
         identifying one or more intermediary nodes in a routing loop based, at least in part, on the IOAM information; and
         generating a report identifying the one or more intermediary nodes in the routing loop; and
         transmitting, to an administrator, the report.

10. The system of claim 9, wherein identifying the expired data packet comprises:
    receiving the expired data packet comprising an expiration field value;

decrementing the expiration field value of the expired data packet; and
determining that the expiration field value is equal to zero.

11. The system of claim 9, wherein:
a source address of the probe packet comprises a probe-specific identifier, and
receiving the probe packet comprises identifying the probe-specific identifier in the probe packet.

12. The system of claim 9, wherein forwarding the probe packet comprises forwarding the probe packet comprising a first expiration field value, and
the operations further comprise:
in response to receiving the probe packet, identifying a second expiration field value comprised in the probe packet;
identifying a size of the routing loop by subtracting the second expiration field value from the first expiration field value; and
generating the report to include the size of the routing loop.

13. The system of claim 9, wherein the expired data packet is a first expired data packet, the destination is a first destination, the probe packet is a first probe packet, and the report is a first report, the operations further comprising:
identifying a second expired data packet addressed to a second destination;
generating a second probe packet addressed to the second destination;
forwarding the second probe packet; and
upon expiration of a wait time after forwarding the second probe packet without having received the second probe packet, transmitting, to the administrator, a second report indicating an absence of a second network loop.

14. The system of claim 9, wherein the expired data packet is a first expired data packet and the probe packet is a first probe packet, the operations further comprising:
receiving multiple second expired data packets;
receiving multiple second probe packets generated by nodes in the network that are external to the system; and
forwarding multiple third probe packets into the network based on the multiple second expired data packets at a generation rate that is based at least partly on an amount of the second probe packets.

15. The system of claim 9, the report being a first report, wherein the operations further comprise:
identifying that a data flow comprises a threshold number of third expired data packets; and
in response to identifying that the data flow comprises the threshold number of third expired data packets, transmitting, to the administrator, a second report indicating a Denial of Service (DoS) attack.

16. A system, comprising:
a network node, comprising:
at least one first processor; and
first memory storing first instructions that, when executed by the at least one first processor, cause the at least one first processor to perform first operations comprising:
identifying an expired data packet transmitted in a network and addressed to a destination;
generating a probe packet addressed to the destination;
forwarding the probe packet in the network;
receiving the probe packet; and
in response to receiving the probe packet:
identifying In-situ Operations, Administration, and Management (IOAM) information in the probe packet;
identifying one or more intermediary nodes in a routing loop based, at least in part, on the IOAM information; and
generating a report identifying the one or more intermediary nodes in the routing loop; and
transmitting, to an administrator, the report; and
the administrator, comprising:
an output device;
at least one second processor; and
second memory storing second instructions that, when executed by the at least one second processor, cause the at least one second processor to perform second operations comprising:
receiving, from the network node, the report; and
outputting, on the output device, a message identifying the routing loop and the network node.

17. The system of claim 16, the network node being a first network node and the report being a first report, the system further comprising:
a second network node, comprising:
at least one third processor; and
third memory storing third instructions that, when executed by the at least one third processor, cause the at least one third processor to perform third operations comprising:
transmitting, to the administrator, a second report indicating the routing loop,
wherein the second operations further comprise:
receiving, from the second network node, the second report; and
generating the message to indicate that the first network node and the second network node are included in the routing loop.

18. The system of claim 16, wherein the expired data packet is a first expired data packet, the probe packet is a first probe packet, and the report is a first report, the first operations further comprising:
identifying a second expired data packet addressed to the destination;
generating a second probe packet addressed to the destination;
forwarding the second probe packet; and
upon expiration of a wait time after forwarding the second probe packet without having received the second probe packet, transmitting, to the administrator, a second report indicating that the routing loop was a temporary routing loop.

19. The system of claim 16, wherein the expired data packet is a first expired data packet, the destination is a first destination, the probe packet is a first probe packet, and the report is a first report, the first operations further comprising:
receiving multiple expired data packets addressed to a second destination, the multiple expired data packets including a second expired data packet;
determining that a number of the multiple expired data packets exceeds a predetermined threshold;
generating a second probe packet addressed to the second destination;
forwarding the second probe packet; and
upon expiration of a wait time after forwarding the second probe packet without having received the second probe packet, transmitting, to the administrator, a second report indicating a Denial of Service (DoS) attack.

* * * * *